United States Patent Office 2,734,915
Patented Feb. 14, 1956

2,734,915

PRODUCTION OF ACRYLAMIDE AND ACRYLIC ACID

Giffin D. Jones, Midland, Mich., assignor to The Dow Chemical Company, Midland, Mich., a corporation of Delaware No Drawing. Application June 7, 1952,
Serial No. 292,381

14 Claims. (Cl. 260—526)

This invention concerns an improved method for the production of acrylamide. It pertains especially to the recovery of acrylamide, or of both acrylamide and acrylic acid, from reaction mixtures comprising the same and sulfuric acid.

A known method for the production of acrylamide involves reacting acrylonitrile with aqueous (preferably concentrated) sulfuric acid at temperatures between 20° and 150° C., thereafter neutralizing the sulfuric acid-rich mixture with an alkali, and separating acrylamide from the neutralized mixture either by extraction with an organic solvent such as acetone, ether, methanol, or isopropanol in instances in which the neutralized mixture contains an appreciably soluble sulfate e. g. sodium sulfate, or, when the neutralization results in formation of an insoluble sulfate such as calcium sulfate, by filtration followed by evaporation of the filtrate to obtain the acrylamide as a residue.

These known procedures for recovering the acrylamide product are disadvantageous in a number of respects. They require use of a considerable amount of alkali to neutralize the sulfuric acid in the reacted mixture; careful, and preferably gradual, addition of the alkali to avoid a violent reaction, or spontaneous overheating, during neutralization of the acid; and either use of an organic solvent for extraction of the product from the neutralized mixture, or filtration to remove an insoluble sulfate followed by careful washing of the residue to recover occluded acrylamide therefrom and evaporation of the combined filtrate and washings to obtain the acrylamide product. Also, a small amount of acrylic acid, which is formed together with the acrylamide, is neutralized and removed in admixture with the sulfate and is usually discarded. Because of the inconvenience and cost involved, these known recovery procedures are not well adapted to commercial practice.

It is an object of this invention to provide an improved method for the production of acrylamide from acrylonitrile which is relatively free of the above-mentioned difficulties. A particular object is to provide such method wherein the acrylamide and sulfuric acid in the reaction mixture are separated directly from one another by a procedure which does not require neutralization of more than a minor amount of the sulfuric acid; does not involve consumption of a large amount of alkali or other chemical agent; does not require employment of an added medium other than water; and does not involve extraction with an organic liquid. A further object is to provide such method wherein acrylamide and acrylic acid are both recovered in a condition substantially free of sulfuric acid. Other objects will be evident from the following description of the invention.

As indicated above, a minor amount of acrylic acid is usually formed together with acrylamide during preparation of the latter by the reaction of acrylonitrile with aqueous sulfuric acid. The proportion of acrylic acid in the mixture usually corresponds to 5 per cent or less of the combined weight of the acrylic acid and acrylamide. However, it has been found that when the reacted mixture contains, or is diluted with, water and is permitted to stand at room temperature, the acrylamide gradually becomes hydrolyzed with formation of a further amount of acrylic acid and also ammonia. The hydrolysis to form acrylic acid can be accelerated by heating the mixture, e. g. to boiling under reflux. Both the acrylamide and the acrylic acid, and also copolymers of the two, are valuable products. For some purposes, e. g. the production of such copolymers, mixtures of acrylamide and acrylic acid are desired. The invention permits formation of mixtures comprising acrylamide and acrylic acid in any desired proportions and separation of the acrylamide and acrylic acid, or a mixture thereof, in a form substantially free of sulfuric acid.

It has been found that granular cation exchange resins have a property of selectively absorbing the acrylamide and acrylic acid from an aqueous solution of a mixture resulting from the reaction of acrylonitrile with aqueous sulfuric acid, leaving the sulfuric acid, or a soluble sulfate, in the surrounding liquid. The absorption appears to occur physically and does not result in spontaneous heating of the mixture or in appreciable destruction of the acrylamide or acrylic acid. The aqueous solution of sulfuric acid or a sulfate which remains after absorption of the acrylamide and acrylic acid by the cation exchange agent can be drained or flushed from the resin, or the resin be removed from such solution, after which the resin can be washed with water to extract acrylic acid and acrylamide from the resin and obtain an aqueous solution of acrylamide and acrylic acid which is free, or nearly free, of sulfuric acid. In the water-washing step, the acrylic acid tends to be extracted from the resin before extraction of the acrylamide takes place and by careful operation, using a low rate of feed of water to a bed of the resin, it is possible to obtain successive fractions of effluent liquor which are rich in acrylic acid and acrylamide, respectively, but are substantially free of sulfuric acid or sulfates. In practice, the extracted acrylic acid and acrylamide are usually permitted to intermingle with one another and are collected together in a fraction of the effluent liquid. Since such fraction is usually richer in acrylamide than in acrylic acid it will hereinafter be referred to as an acrylamide solution.

The acrylamide solution thus obtained usually contains small amounts of acrylic acid and ammonia, or ammonium ions, and also a very small amount of sulfuric acid. The small amounts of ammonia and sulfuric acid which are present, e. g. as ammonium bisulfate, are not always objectionable. However, they, and also the acrylic acid if desired, can be removed by reaction with ion exchange agents. Ways of removing such impurities by ion exchange procedures to leave the acrylamide in solution are hereinafter described. The sulfuric acid-free acrylamide solution can be used directly, or in a concentrated form, for the production of polymers or copolymers of acrylamide. Alternatively, it can be evaporated to recover the acrylamide in solid form.

Any cation exchange resin can be used for the physical absorption of acrylamide and acrylic acid from the aqueous sulfuric acid solution containing the same, but resins containing sulfonate radicals as the ionizable groups thereof are preferred. A considerable number and variety of suitable cation exchange resins are known. Examples of such resins are sulfonated phenol-formaldehyde resins, and the sulfonated copolymers of monovinyl aromatic hydrocarbons and polyvinyl aromatic hydrocarbons disclosed in U. S. Patent 2,366,007. The cation exchange resin is preferably employed in its acidic, i. e. hydrogen-ion, form, but it may initially be in the form of a salt thereof, e. g. an ammonium or an alkali metal salt capable of reacting with the sulfuric acid to form a water-soluble sulfate. When the resin is initially in salt form, it is converted, at least in part, to its acidic form upon treatment with the mixture resulting from the reaction of acrylonitrile with aqueous sulfuric acid.

When contacted with the cation exchange resin, the reaction mixture containing acrylamide, acrylic acid, ammonium ions and sulfuric acid should also contain water, usually in amount such as to form, with the sulfuric acid, an aqueous sulfuric acid solution of from 30 to 70 per cent by weight concentration, but it may be of somewhat lower or higher concentrations if desired. If desired, the crude reaction mixture in a substantially anhydrous condition can be fed directly to a water-immersed bed of the cation exchange resin, the water in the bed serving to dilute the mixture sufficiently to permit ready and selective absorption of the acrylamide and acrylic acid by the resin, but in practice the reaction mixture is preferably diluted with water prior to being fed to the bed. Concentrated sulfuric acid, e. g. of from 80 to 95 weight per cent concentration, is preferably reacted with acrylonitrile to form the acrylamide and acrylic acid. Accordingly, the reacted mixture is usually diluted with water in order to bring it to the preferred concentrations just mentioned. The acrylamide and acrylic acid in the mixture may each be of any concentration, but the total molal concentration of these two products is usually about the same as, or somewhat lower than, that of the sulfuric acid. It has been observed that the yield of acrylamide decreases, due to hydrolysis to acrylic acid and occurrence of side reactions, when the diluted reaction mixture comprising acrylamide and sulfuric acid is permitted to stand, e. g. for a day or longer. Accordingly, when acrylamide is desired as the product, the reaction mixture is advantageously treated in accordance with the invention to separate the acrylamide and sulfuric acid from one another within a day, advantageously within 10 hours, and preferably as soon as possible, after completion of the reaction for formation of the acrylamide.

In practice of the invention, acrylonitrile is reacted with aqueous sulfuric acid in accordance with known procedure. Ways of carrying out the reaction are described in detail in French Patent 898,275, British Patent 631,592, and J. A. C. S. 67, 1227 (1945). It may be mentioned that the acrylonitrile and sulfuric acid are usually employed in approximately equimolecular proportions; that the reaction is usually carried out by heating the mixture at temperatures of from 80° to 110° C., e. g. for from 30 minutes to a day or longer, the optimum time being dependent on whether acrylamide or acrylic acid is desired as the principal product; that the sulfuric acid starting material is usually of 70 weight per cent concentration or higher, a concentration of from 80 to 95 per cent being suitable for the production of acrylamide and a concentration of from 70 to 80 per cent being preferred for the production of acrylic acid; and that a small amount of a polymerization inhibitor such as copper powder is advantageously added prior to the reaction. Reaction temperatures above 120° C. are preferably avoided, since they appear to cause polymerization or other destruction of a portion of the acrylamide product.

After completion of the reaction, the mixture is preferably diluted gradually with water, usually in amount such that the proportions of sulfuric acid and water in the resulting solution correspond to an aqueous sulfuric acid solution of from 30 to 70 weight per cent concentration.

The diluted mixture is fed to a column containing a granular cation exchange resin immersed in water, or other aqueous liquid. The rate of feed is gradual so as to permit time for absorption of the acrylamide and acrylic acid by the resin and also in order to avoid, as nearly as possible, turbulence such as would result in intermixing of the feed material with the water being flushed from the resin bed. The direction of flow through the bed is preferably upward or downward. Feed of the diluted mixture is preferably discontinued before the resin has absorbed its capacity of acrylamide and acrylic acid, but the feed can be continued beyond this point, if desired, and the portion of effluent liquor containing sulfuric acid together with acrylamide and/or acrylic acid can subsequently be recycled through the bed of ion exchange material. After discontinuing the feed of the sulfuric acid-containing solution, water is fed to the column to extract and flush absorbed acrylic acid and acrylamide from the resin bed. The solution of acrylamide and/or acrylic acid which flows from the bed is collected, usually in fractions, as product. The feed of water is preferably continued until water alone flows from the bed. The feed of water is then discontinued and feed of the aqueous solution of acrylamide, acrylic acid and sulfuric acid to the bed is resumed for purpose of separating further amounts of acrylamide and acrylic acid from the sulfuric acid.

During the initial feed of the solution of acrylamide, acrylic acid and sulfuric acid to the bed of cation exchange resin, water is flushed from the bed. During continuance of such feed, or during the subsequent water-washing operation, an aqueous solution of sulfuric acid, or a salt thereof, which is free, or nearly free, of acrylamide and acrylic acid flows from the bed and is advantageously collected. When the cation exchange agent is initially in its acidic form, it is a dilute sulfuric acid solution of good purity which is obtained. This solution may be reconcentrated, or be used in making suitable salts, e. g. ammonium sulfate. When the cation exchange agent is initially in salt form, the sulfate solution which flows from the bed comprises a salt of sulfuric acid, e. g. ammonium bisulfate, or a mixture of such salt and sulfuric acid. If the feed of the solution of acrylamide, acrylic acid and sulfuric acid is continued beyond the point at which the bed is saturated with absorbed acrylamide and/or acrylic acid, the composition of the effluent liquor again changes to approach that of the feed material. Such effluent liquor, if obtained, is collected as a separate fraction and is again fed to the bed of ion exchange material in a subsequent cycle of the aforementioned operations.

After discontinuing feed of the solution of acrylamide, acrylic acid and sulfuric acid to the bed and, instead, feeding water to the bed, the remaining amount of sulfuric acid (as such or as a salt thereof) is first flushed from the bed after which the composition of the effluent liquor changes quite sharply and a solution of acrylamide and/or acrylic acid which is free, or nearly free, of sulfuric acid or sulfates flows from the bed. This solution is usually collected in successive fractions which are of increasing and then decreasing concentrations. The more concentrated fractions of the acrylamide solution may be evaporated to obtain solid acrylamide as a residual product, or they may be used directly, e. g. in an emulsion, suspension, or solution polymerization procedure, for the production of polymers or copolymers of acrylamide. The more dilute effluent fractions of the acrylamide-containing solution may again be fed, in a subsequent cycle of the process, to the bed of cation exchange resin to absorb and collect the acrylamide and any acrylic acid therefrom.

By careful operation of the process as just described, it is possible to separate the acrylamide and acrylic acid from the sulfuric acid and obtain them in a form practically free of sulfuric acid. However, unless considerable care is observed, the consecutive effluent fractions of aqueous sulfuric acid and of the aqueous acrylamide-acrylic acid solution tend to overlap, or become intermixed, to a slight extent with a result that the effluent solution of acrylamide and acrylic acid contains a very small amount, e. g. a trace, of sulfuric acid. Ammonia, or ammonium ions are also usually present in minor amount. In instances in which the acrylamide-acrylic acid solution is to be stored or heated, e. g. to concentrate the same, it is desirable that all of the sulfuric acid be removed, since it tends to cause gradual destruction of the acrylamide.

The acrylic acid and the small amount of sulfuric acid usually present in the acrylamide solution thus obtained may be removed by contacting the solution with a basic form of an anion exchange agent in amount sufficient to react chemically with the acids, or by contacting the solution with a salt, other than a sulfate or acrylate, of such agent. A variety of suitable anion exchange agents, such as the resinous condensation products of phenol, formaldehyde and polyethylene-polyamines and the reaction products of amines such as trimethylamine or dimethylethanolamine with a chloromethylated copolymer of styrene, ar-ethylvinylbenzene and divinylbenzene, etc., are known. When a sulfuric acid-free solution of acrylamide and acrylic acid is desired as the product, an acrylate of the anion exchange agent may be used for the treatment, in which case the minor amount of sulfuric acid in the acrylamide containing solution reacts with, and is chemically absorbed by, the agent and displaces acrylate radicals from the agent so as to increase the concentration of acrylic acid in the solution.

After being freed of any remaining small amounts of sulfuric acid in either of the ways just mentioned, the acrylamide-containing solution usually retains a minor amount of ammonia or ammonium ions. Such impurities may conveniently be removed by passing the solution through a bed of a cation exchange agent in its acidic form.

If desired, the above-mentioned treatments to remove minor amounts of impurities by chemical reaction with anion- and cation-exchange agents may be reversed in order, or either or both of such treatments may be omitted. Since these chemical treatments involve removal of only minor amounts of impurities from an aqueous acrylamide-acrylic acid solution which has been rendered nearly free of sulfuric acid in the preceding and principal purification step of the process, small beds of the ion exchange agents can be used for removal of the impurities from a large volume of the solution before reactivation of the agents becomes necessary. When necessary, the ion exchange agents may be regenerated in usual ways, e. g. by treating the anion exchange agent with an aqueous solution of an alkali, or a salt containing anions of the kind desired in the regenerated agent, and by treating the spent cation exchange agent with an aqueous solution of an acid such as hydrochloric acid or sulfuric acid. The regenerated ion exchange resins are washed with water prior to being reemployed in the process.

The process, as just described, may be modified by simultaneous employment of two or more beds of cation exchange resin, with feed of the aqueous solution of acrylamide, acrylic acid and sulfuric acid to one bed while flushing treated liquor and absorbed acrylamide from another bed. By thus employing the beds in parallel with one another and using them alternately for the treatment of the aqueous solution of acrylamide, acrylic acid and sulfuric acid, the process can be carried out in a continuous manner.

The following examples describe certain ways in which the invention has been practiced, but are not to be construed as limiting its scope.

EXAMPLE 1

Approximately 1060 grams of acrylonitrile was added gradually and with stirring to a mixture of 2320 grams of aqueous sulfuric acid of 85 weight per cent concentration and 4 grams of copper powder while heating the mixture at a temperature of about 100° C. The mixture was stirred and heated at 100° C. for about 45 minutes after adding the acrylonitrile. The reaction mixture was then cooled and diluted by gradually adding 2 liters of water with stirring. Based on an assumption that all of the acrylonitrile has been converted to acrylamide, one gram of the resultant solution should, theoretically, contain 0.0037 gram mole of sulfuric acid and 0.0037 gram mole of acrylamide. Actually, acrylamide was present as the principal product together with a minor amount of acrylic acid. It is estimated that the product contained about 19 molecular equivalents of acrylamide per mole of acrylic acid. A 5 cc. portion of the solution (which weighed 6.44 grams and which should theoretically have contained 0.0238 gram mole of acrylamide) was fed to a column of 0.6 inch internal diameter and containing 100 cc. of a granular form of a water-insoluble ammonium salt of a sulfonated copolymer of about 90 per cent by weight of styrene, about 6 per cent of ar-ethylvinylbenzene and about 4 per cent of divinylbenzene, which granular ammonium salt was immersed in water. The sulfonated copolymer was of from 50 to 100 mesh size according to the Tyler screen scale. The solution was fed to the column at a rate of 1 cc. per minute with resultant displacement of water from the column. After introducing the solution of acrylamide and sulfuric acid, water was fed to the column at a rate of 1 cc. per minute. The displaced effluent liquor was collected as successive fractions. The early fractions of effluent liquid were water; the next several fractions were an aqueous ammonium bisulfate solution; and the next several fractions were aqueous solutions of acrylamide. The index of refraction of the individual fractions were determined. By comparison with previously obtained index of refraction values of aqueous acrylamide solutions of different known concentrations, there was determined the amount of acrylamide in each of the aqueous acrylamide fractions of the effluent liquor. Table I gives the volumes, in cubic centimeters, of successive fractions of the effluent liquor and the index of refraction, $n_D^{35}$, of each such fraction. It also gives the weight, in grams, of acrylamide in each of the aqueous acrylamide fractions.

*Table I*

| Fraction | | $n_D^{35}$ | Solute in Fraction | Acrylamide Present, gms. |
|---|---|---|---|---|
| No. | cc. | | | |
| 1 | 0–32 | 1.3311 | none, i.e. H₂O alone | |
| 2 | 32–40 | 1.3350 | NH₄HSO₄ | |
| 3 | 40–48 | 1.3435 | NH₄HSO₄ | |
| 4 | 48–56 | 1.3593 | NH₄HSO₄ | |
| 5 | 56–60 | 1.3613 | NH₄HSO₄ | |
| 6 | 60–62.5 | 1.3618 | NH₄HSO₄ | |
| 7 | 62.5–64 | 1.3340 | NH₄HSO₄ | |
| 8 | 64–65.6 | 1.3324 | NH₄HSO₄ | |
| 9 | 65.5–72 | 1.3312 | practically none | |
| 10 | 72–80 | 1.3329 | acrylamide | 0.076 |
| 11 | 80–88 | 1.3358 | ......do...... | 0.143 |
| 12 | 88–96 | 1.3381 | ......do...... | 0.304 |
| 13 | 96–104 | 1.3385 | ......do...... | 0.361 |
| 14 | 104–112 | 1.3383 | ......do...... | 0.323 |
| 15 | 112–120 | 1.3364 | ......do...... | 0.228 |
| 16 | 120–128 | 1.3346 | ......do...... | 0.143 |
| 17 | 128–144 | 1.3320 | ......do...... | 0.112 |

The effluent fractions 10–17 contained a total of approximately 1.69 grams, i. e. 0.0238 gram mole, of acrylamide. Accordingly, the recovery of acrylamide in the aqueous acrylamide fractions of the effluent liquor was nearly quantitative.

EXAMPLE 2

The reaction of acrylonitrile and sulfuric acid to form a mixture comprising acrylamide, sulfuric acid, and a minor amount of acrylic acid was carried out under the conditions, and using the kinds and amounts of starting materials, described in Example 1. However, in this instance, the reacted mixture was diluted with water to a final volume of 10.9 liters. One fourth, i. e. about 2,725 cc., of the resulting solution was slowly fed to a column containing 0.8 cubic foot, of a cation exchange resin, similar to that employed in Example 1, immersed in water. Water was thereby displaced from the column. After the solution had been fed to the column, water was introduced and the displaced effluent liquor was collected as successive 500 cc. fractions. Each fraction was tested to determine its index of refraction. In a second cycle of the acrylamide recovery operations, another fourth of the diluted reaction mixture was fed to the column, after which an aqueous ammonium bisulfate portion of the effluent liquor previously collected was introduced to the column. Water was then fed into displace the sulfate solution and then an aqueous acrylamide solution from the column and the effluent liquid was collected as successive 500 cc. fractions. Each fraction was tested to determine its index of refraction. Five of the fractions were each found to contain more than 4 per cent by weight of acrylamide and were set aside as product. The other, and more dilute, acrylamide-containing fractions were combined to form a "solution A" which was reserved for use in a third cycle of the recovery operations. In the third cycle, another one-fourth of the aforementioned diluted reaction mixture was fed to the column, after which the above-mentioned solution A was fed to the column. Water was then fed to the column and the displaced effluent liquid was collected as successive 500 cc. fractions which were tested for refractive index. Seven of the fractions each contained more than 4 weight per cent of acrylamide and were set aside as product. The other, and more dilute, acrylamide-containing fractions of the effluent liquor were combined to form a "solution B." The final one-fourth of the aforementioned diluted reaction mixture was then fed to the column, after which "solution B" was fed to the column. Water was then fed to the column. As in the preceding cycles, the effluent liquid was collected as successive 500 cc. fractions. Nine of the fractions collected in this fourth cycle of the recovery operations were each found to contain more than 4 weight per cent of acrylamide and were set aside as product. It may be mentioned that the most concentrated of the effluent acrylamide containing fractions collected in the second cycle of recovery operations contained 5.45 weight per cent of acrylamide; the most concentrated of such fractions collected in the third cycle contained 6.22 per cent of acrylamide; and the most concentrated of such fractions collected in the fourth cycle contained 6.42 per cent of acrylamide. Accordingly, the operations of returning the more dilute of the acrylamide fractions collected in one of the cycles as a portion of the wash water for displacement of product from the column in a subsequent cycle, not only avoids loss of acrylamide, but causes an increase in peak concentration of the acrylamide-containing fractions collected in the subsequent cycle. The aforementioned acrylamide-containing fractions which had been set aside as product in the second, third, and fourth cycles of the recovery operations were combined. The resulting solution contained 5.5 per cent by weight, or a total of 855 grams, of acrylamide. It contained a very small amount, i. e. about 0.5 gram, of sulfuric acid.

EXAMPLE 3

To one liter of the aqueous 5.5 per cent acrylamide solution which was obtained as product in Example 2, there were added 55 grams of acrylic acid and 5 cc. of an aqueous hydrogen peroxide solution of 30 wt. per cent concentration. The resulting solution was heated on a steam bath under an atmosphere of nitrogen for one hour. The solution was then concentrated, by evaporation, to a point at which the residue weighed 625 grams. The residue was a viscous solution of polymeric material. A portion of the viscous solution was diluted with methanol to precipitate the polymer which was separated and dried. One part by weight of the dried solid polymer was dissolved in 199 parts of water. The resulting solution had a viscosity of 1.712 centipoises at room temperature.

EXAMPLE 4

A mixture of 169 grams (1 mole) of acrylamide bisulfate and 9 grams (0.5 mole) of water was heated on a steam bath under a reflux condenser for 2 hours and then permitted to cool to about room temperature. A 16.9 gram portion of the resulting mixture was dissolved in water to form a solution having a volume of 30 cc. A 10 cc. portion of this solution was analyzed for acrylic acid and found to contain 0.0045 gram mole of the latter. Therefore, approximately 14.2 per cent of the acrylamide bisulfate had been hydrolyzed to form acrylic acid, presumably leaving 0.0271 gram mole of unconsumed acrylamide bisulfate in the 10 cc. portion of the solution. Another 10 cc. portion of the solution was fed at a rate of 1 cc. per minute to a column of 0.6 inch internal diameter, containing 100 cc. of a granular cation exchange resin, of from 50 to 100 mesh particle size, immersed in water. The cation exchange resin was similar to that employed in Example 1, except that it was in its acidic form. The inflow of the solution caused displacement of water from the column. After introducing the 10 cc. portion of the solution of the column, water was fed to the column. The liquid which was displaced and flowed from the column during the foregoing operations was collected as successive small fractions and the index of refraction of each fraction was determined. The first 20 cc. of the effluent liquor was water. The next 46 cc. portion comprised aqueous sulfuric acid fractions of successively increasing and then decreasing concentrations. The next 50 cc. portion of the effluent liquor comprised acrylic acid together with acrylamide. The next 88 cc. portion of the effluent liquor contained acrylamide as the principal solute and only a small amount of acrylic acid. The abovementioned portions of the effluent liquor which contained acrylic acid and acrylamide were nearly free of sulfuric acid. Table II gives the portion, in cubic centimeters, of the effluent liquor that was collected as each fraction and the index of refraction, $n_D^{28}$, of each fraction. The table also indicates the identity of the principal solute, or solutes, in each fraction, except in the instances in which the amount of solute was so small as to be negligible.

*Table II*

| Fraction | | $n_D^{28}$ | Principal Solute Present |
|---|---|---|---|
| No. | cc. | | |
| 1 | 20 | 1.3322 | |
| 2 | 20–24 | 1.3328 | H₂SO₄. |
| 3 | 24–28 | 1.3330 | H₂SO₄. |
| 4 | 28–32 | 1.3348 | H₂SO₄. |
| 5 | 32–36 | 1.3370 | H₂SO₄. |
| 6 | 36–40 | 1.3400 | H₂SO₄. |
| 7 | 40–44 | 1.3431 | H₂SO₄. |
| 8 | 44–48 | 1.3260 | H₂SO₄. |
| 9 | 48–52 | 1.3490 | H₂SO₄. |
| 10 | 52–56 | 1.3491 | H₂SO₄. |
| 11 | 56–60 | 1.3259 | H₂SO₄. |
| 12 | 60–64 | 1.3419 | H₂SO₄. |
| 13 | 64–68 | 1.3356 | H₂SO₄. |
| 14 | 68–72 | 1.3330 | |
| 15 | 72–74 | 1.3330 | |
| 16 | 74–76 | 1.3331 | |
| 17 | 76–80 | 1.3332 | |
| 18 | 80–84 | 1.3336 | Acrylic acid+Acrylamide. |
| 19 | 84–88 | 1.3337 | Do. |
| 20 | 88–92 | 1.3339 | Do. |
| 21 | 92–96 | 1.3341 | Do. |
| 22 | 96–100 | 1.3349 | Do. |
| 23 | 100–104 | 1.3352 | Do. |
| 24 | 104–108 | 1.3358 | Do. |
| 25 | 108–112 | 1.3360 | Do. |
| 26 | 112–116 | 1.3361 | Do. |

Table II.—Continued

| Fraction | | $n_D^{28}$ | Principal Solute Present |
|---|---|---|---|
| No. | cc. | | |
| 27 | 116–120 | 1.3361 | Acrylamide. |
| 28 | 120–124 | 1.3361 | Do. |
| 29 | 124–128 | 1.3361 | Do. |
| 30 | 128–132 | 1.3362 | Do. |
| 31 | 132–136 | 1.3364 | Do. |
| 32 | 136–140 | 1.3366 | Do. |
| 33 | 140–144 | 1.3368 | Do. |
| 34 | 144–148 | 1.3367 | Do. |
| 35 | 148–152 | 1.3364 | Do. |
| 36 | 152–156 | 1.3360 | Do. |
| 37 | 156–160 | 1.3356 | Do. |
| 38 | 160–164 | 1.3352 | Do. |
| 39 | 164–168 | 1.3348 | Do. |
| 40 | 168–172 | 1.3343 | Do. |
| 41 | 172–176 | 1.3340 | Do. |
| 42 | 176–180 | 1.3337 | Do. |
| 43 | 180–184 | 1.3334 | Do. |
| 44 | 184–188 | 1.3331 | Do. |
| 45 | 188–192 | 1.3330 | Do. |
| 46 | 192–196 | 1.3329 | Do. |
| 47 | 196–200 | 1.3328 | Do. |
| 48 | 200–204 | 1.3327 | Do. |
| 49 | 204–208 | 1.3326 | Do. |
| 50 | 208–212 | 1.3325 | Do. |
| 51 | 212–216 | 1.3324 | Do. |
| 52 | 216–220 | 1.3323 | Do. |
| 53 | 220–224 | 1.3322 | |

From analyses which were made, it was found that there were a total of approximately 1.92 grams (0.027 mole) of acrylamide and a total of 0.21 gram (0.003 mole) of acrylic acid, in the combined fractions 18–52 of the above-mentioned effluent liquor. Accordingly, the recovery of the acrylamide was practically quantitative and the recovery of the acrylic acid was about 65 per cent of theoretical, both products being recovered in a form free of all except a trace of sulfuric acid.

I claim:

1. A method which comprises contacting an aqueous solution of acrylamide and sulfuric acid with a cation exchange resin, whereby the acrylamide is absorbed by the resin leaving the sulfate radicals of the sulfuric acid in the surrounding liquid, separating the thus-treated resin from the surrounding aqueous sulfate solution, and washing the resin with water to extract and recover the acrylamide therefrom.

2. In a method wherein a mixture comprising acrylamide and sulfuric acid is made by reacting water with acrylonitrile in the presence of sulfuric acid, the steps of bringing the water content of the mixture to a point such that the amounts of sulfuric acid and water in the mixture correspond to an aqueous sulfuric acid solution of not greater than 70 weight per cent concentration feeding the resulting solution to a water-immersed bed of a cation exchange resin to displace water from the bed, thereafter feeding water to the bed to displace a further amount of liquid from the bed, and collecting successive fractions of the displaced effluent liquid whereby there is obtained a fraction of the effluent liquid which contains a major portion of the sulfate radicals of the sulfuric acid and a subsequent fraction of the effluent liquid which contains a major portion of the acrylamide.

3. A method, as claimed in claim 2, wherein the action exchange resin is one containing sulfonate radicals as the ion exchange groups.

4. A method wherein the steps described in claim 2 are repeated using a further amount of diluted reaction mixture as a feed material to the bed of cation exchange resin.

5. A method for separating from one another the acrylamide and sulfuric acid occurring in an aqueous solution of acrylamide and sulfuric acid, which method comprises feeding the solution into admixture with a granular cation exchange resin, whereby acrylamide is selectively absorbed by the resin, thereafter passing water through a body of the granular cation exchange resin to flush an aqueous sulfate solution from the resin and then to extract the absorbed acrylamide from the resin and, after the aqueous sulfate solution has flowed from the body of resin, collecting the effluent aqueous acrylamide solution.

6. A method, as claimed in claim 5, wherein the cation exchange resin is a sulfonated resin.

7. A method, as claimed in claim 5, wherein the cation exchange resin is a sulfonated copolymer of a major amount of styrene and minor amounts of ar-ethylvinylbenzene and divinylbenzene.

8. In a method wherein a mixture comprising acrylamide, acrylic acid, ammonium bisulfate and sulfuric acid is made by reacting water with acrylonitrile in the presence of sulfuric acid, the steps of bringing the water content of the mixture to a point such that the amounts of sulfuric acid and water in the mixture correspond to an aqueous sulfuric acid solution of not greater than 70 weight per cent concentration, feeding the solution to water-immersed bed of a cation exchange resin to displace water from the bed, thereafter feeding water to the bed to displace a further amount of liquid from the bed, and collecting successive fractions of the displaced effluent liquid, whereby there is obtained a fraction of the effluent liquid which contains a major portion of the sulfate radicals of the sulfuric acid and subsequent fractions of the effluent liquid which contain a major amount of the acrylic acid and a major amount of the acrylamide.

9. A method which comprises feeding an aqueous solution of acrylamide, acrylic acid, ammonium bisulfate and sulfuric acid, which solution contains water and sulfuric acid in relative proportions corresponding to an aqueous sulfuric acid solution of not greater than 70 weight per cent concentration, to a water-immersed bed of a cation exchange resin to displace water from the bed, thereafter feeding water to the bed to displace a further amount of liquid from the bed, and collecting a fraction of the effluent liquid which contains a major amount of the sulfate radicals of the sulfuric acid and a subsequent fraction of the effluent liquor which contains acrylamide and acrylic acid together with minor amounts of sulfate and ammonium ions, and passing the fraction containing the acrylamide and acrylic acid into contact with an anion exchange agent in other than its sulfate form, whereby the remaining sulfate is chemically reacted with the anion exchange resin and thus removed from the solution.

10. A method, as claimed in claim 9, wherein the anion exchange agent is initially in its basic form and acrylate and sulfate ions are both chemically absorbed by the anion exchange agent and thus removed from the acrylamide-containing solution which is contacted with the agent.

11. A method, as claimed in claim 9, wherein the anion exchange agent is initially in the form of its arcylate, and sulfate ions are chemically absorbed by the agent with displacement of acrylate radicals from the agent, whereby the aqueous solution of acrylamide and acrylic acid that is contacted with the agent is freed of sulfate and enriched in acrylic acid.

12. A method, as claimed in claim 9, wherein the fraction of effluent liquid which contains acrylamide and arcylic acid together with minor amounts of sulfate and ammonium ions as impurities is freed of the impurities by being contacted both with an anion exchange agent in other than its sulfate form and with an acidic form of a cation exchange agent.

13. A method, as claimed in claim 12, wherein the anion exchange agent is initially in its basic form so that sulfate and acrylate ions are both chemically absorbed by the agent and thereby removed from the acrylamide-containing solution which is contacted witth the agent.

14. A method, as claimed in claim 12, wherein the anion exchange agent is initially in the form of its acrylate so that the sulfate ions are chemically absorbed by the agent with displacement of acrylate ions from the agent and the aqueous solution of acrylamide and acrylic acid which is contacted with the agent is thereby enriched in acrylic acid.

References Cited in the file of this patent

Samuelson: Ion Exchangers in Analytical Chemistry (Wiley), pages 21 and 22 (1953).